US010699731B1

(12) United States Patent
Wu

(10) Patent No.: US 10,699,731 B1
(45) Date of Patent: Jun. 30, 2020

(54) PERMANENT MAGNET ASSISTED MAGNETIC RECORDING

(71) Applicant: Headway Technologies, Inc., Milpitas, CA (US)

(72) Inventor: Yan Wu, Cupertino, CA (US)

(73) Assignee: Headway Technologies, Inc., Milpitas, CA (US)

(*) Notice: Subject to any disclaimer, the term of this patent is extended or adjusted under 35 U.S.C. 154(b) by 0 days.

(21) Appl. No.: 16/250,697

(22) Filed: Jan. 17, 2019

(51) Int. Cl.
G11B 5/127 (2006.01)
G11B 5/60 (2006.01)
G11B 5/23 (2006.01)
G11B 5/48 (2006.01)
G11B 5/11 (2006.01)

(52) U.S. Cl.
CPC ............. G11B 5/1278 (2013.01); G11B 5/11 (2013.01); G11B 5/23 (2013.01); G11B 5/4826 (2013.01); G11B 5/6082 (2013.01)

(58) Field of Classification Search
CPC ...... G11B 5/315; G11B 5/1278; G11B 5/3116
See application file for complete search history.

(56) References Cited

U.S. PATENT DOCUMENTS 6,594,112 B1* 7/2003 Crue .................... G11B 5/3116
360/123.26
6,807,032 B1* 10/2004 Seigler ................. G11B 5/3912
360/319
6,809,899 B1 10/2004 Chen et al.
6,954,340 B2 10/2005 Shukh et al.
(Continued)

FOREIGN PATENT DOCUMENTS

JP 2002-133610 5/2002
JP 2002-298309 10/2002
(Continued)

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.
(Continued)

Primary Examiner — Brian E Miller
(74) Attorney, Agent, or Firm — Saile Ackerman LLC; Stephen B. Ackerman

(57) ABSTRACT

A perpendicular magnetic recording writer is disclosed with a permanent magnet (PM) formed within a write gap (WG) that is between a main pole (MP) trailing side and a trailing shield. The PM has a magnetization that is anti-parallel to a WG field ($H_{WG}$) when a transition is written thereby enhancing the MP field on a magnetic bit, and generates a PM field that assists the MP field. When $H_{WG}$ becomes saturated after the transition is written and exceeds PM coercivity that is from 500 Oe to 8000 Oe, PM magnetization flips to an opposite direction and reduces the MP field thereby improving adjacent track erasure. The PM may be at the air bearing surface (ABS) or recessed up to 50 nm from the ABS, and has a down-track thickness less than the WG thickness, and a cross-track width≤to the track width of the MP trailing side.

10 Claims, 9 Drawing Sheets

(56) References Cited

U.S. PATENT DOCUMENTS

| | | | |
|---|---|---|---|
| 7,009,812 B2 | 3/2006 | Hsu et al. | |
| 7,268,974 B2 | 9/2007 | Lille | |
| 7,724,469 B2 * | 5/2010 | Gao | G11B 5/1278 360/125.3 |
| 7,835,111 B2 | 11/2010 | Flint et al. | |
| 7,952,831 B2 | 5/2011 | Kim et al. | |
| 7,957,098 B2 * | 6/2011 | Yamada | G11B 5/02 360/125.3 |
| 7,963,024 B2 | 6/2011 | Neuhaus | |
| 7,982,996 B2 | 7/2011 | Smith et al. | |
| 8,027,110 B1 | 9/2011 | Yamanaka et al. | |
| 8,064,244 B2 | 11/2011 | Zhang et al. | |
| 8,068,312 B2 | 11/2011 | Jiang et al. | |
| 8,111,479 B2 | 2/2012 | Chen et al. | |
| 8,154,825 B2 | 4/2012 | Takashita et al. | |
| 8,264,792 B2 | 9/2012 | Bai et al. | |
| 8,284,516 B1 | 10/2012 | Tang et al. | |
| 8,295,008 B1 | 10/2012 | Sasaki et al. | |
| 8,310,787 B1 | 11/2012 | Sasaki et al. | |
| 8,427,781 B1 | 4/2013 | Sasaki et al. | |
| 8,477,452 B2 | 7/2013 | Sasaki et al. | |
| 8,493,687 B2 | 7/2013 | Sasaki et al. | |
| 8,542,461 B2 | 9/2013 | Bai et al. | |
| 8,582,238 B1 | 11/2013 | Liu et al. | |
| 8,582,240 B1 | 11/2013 | Chen et al. | |
| 8,582,241 B1 | 11/2013 | Yu et al. | |
| 8,749,919 B2 | 6/2014 | Sasaki et al. | |
| 8,767,347 B1 | 7/2014 | Sasaki et al. | |
| 8,792,210 B2 | 7/2014 | de la Fuente et al. | |
| 8,879,208 B1 | 11/2014 | Liu et al. | |
| 9,082,433 B1 | 7/2015 | Tang et al. | |
| 9,299,367 B1 | 3/2016 | Tang et al. | |
| 9,361,912 B1 | 6/2016 | Liu et al. | |
| 9,406,317 B1 | 8/2016 | Tang et al. | |
| 9,466,319 B1 | 10/2016 | Tang et al. | |
| 9,508,364 B1 | 11/2016 | Tang et al. | |
| 9,824,701 B2 | 11/2017 | Tang et al. | |
| 10,014,021 B1 | 7/2018 | Liu et al. | |
| 10,032,469 B2 | 7/2018 | Lim et al. | |
| 10,325,618 B1 * | 6/2019 | Wu | G11B 5/11 |
| 2002/0034043 A1 | 3/2002 | Okada et al. | |
| 2003/0204952 A1 * | 11/2003 | Crue | B82Y 10/00 29/890.1 |
| 2004/0150910 A1 | 8/2004 | Okada et al. | |
| 2005/0128637 A1 | 6/2005 | Johnston et al. | |
| 2005/0141137 A1 | 6/2005 | Okada et al. | |
| 2005/0142385 A1 | 6/2005 | Jin | |
| 2006/0044682 A1 | 3/2006 | Le et al. | |
| 2006/0087765 A1 | 4/2006 | Iwakura et al. | |
| 2006/0103978 A1 | 5/2006 | Takano et al. | |
| 2007/0171575 A1 | 7/2007 | Lim et al. | |
| 2007/0177301 A1 | 8/2007 | Han et al. | |
| 2008/0013209 A1 | 1/2008 | Sasaki et al. | |
| 2008/0088972 A1 | 4/2008 | Sasaki et al. | |
| 2009/0059426 A1 | 3/2009 | Sasaki et al. | |
| 2009/0128953 A1 | 5/2009 | Jiang et al. | |
| 2009/0296275 A1 | 12/2009 | Sasaki et al. | |
| 2010/0165517 A1 | 7/2010 | Araki et al. | |
| 2011/0116195 A1 * | 5/2011 | Cazacu | G11B 5/193 360/319 |
| 2011/0211271 A1 | 9/2011 | Ng et al. | |
| 2013/0027809 A1 | 1/2013 | Min et al. | |
| 2013/0335847 A1 * | 12/2013 | Shiroishi | G11B 5/02 360/46 |
| 2014/0071562 A1 | 3/2014 | Chen et al. | |
| 2014/0177092 A1 | 6/2014 | Katada et al. | |
| 2015/0043106 A1 | 2/2015 | Yamada et al. | |
| 2017/0133044 A1 | 5/2017 | Lim et al. | |

FOREIGN PATENT DOCUMENTS

| | | |
|---|---|---|
| JP | 2008-021398 | 1/2008 |
| JP | 2010-157303 | 7/2010 |

OTHER PUBLICATIONS

Microwave Assisted Magnetic Recording, by Jian-Gang Zhu et al., IEEE Transactions on Magnetics, vol. 44, No. 1, Jan. 1, 2008, pp. 125-131.

Effect of 3d, 4d, and 5d transition metal doping on damping in permalloy thin films, by J. O. Rantschler et al., Journal of Applied Physics 101, 033911, Feb. 14, 2007, pp. 1-5.

"Magnetic Damping in Ferromagnetic Thin Films," by Mikihiko Oogane et al., Japanese Journal of Applied Physics, vol. 45, No. 5A, May 2006, pp. 3889-3891.

* cited by examiner

PERMANENT MAGNET ASSISTED MAGNETIC RECORDING

RELATED PATENT APPLICATIONS

This application is related to the following: U.S. Pat. No. 10,014,021; and, Ser. No. 16/037,197, filing date Jul. 17, 2018; assigned to a common assignee and herein incorporated by reference in their entirety.

TECHNICAL FIELD

The present disclosure relates to a design for a perpendicular magnetic recording (PMR) writer wherein a permanent magnet (PM) having a magnetization opposite to that of the WG field is inserted in the write gap (WG), and generates a magnetic field that enhances the main pole (MP) field on the magnetic medium at the start of writing a transition, but PM magnetization flips to an opposite direction when the WG field increases beyond the coercivity of the PM after the transition is written thereby reducing the MP field and improving adjacent track erasure (ATE).

BACKGROUND

As the data areal density in hard disk drive (HDD) increases, critical dimensions in the write heads are required to be made in smaller sizes in order to be able to write small media bits. However, as the main pole dimensions (track width and down-track thickness) shrink, its writability degrades. To improve writability, new technology is being developed that assists writing by either increasing the effective write field generated by the heads or by heating up the media to lower the coercivity in the media near the area when the transition is written. Two approaches currently being investigated are heat assisted magnetic recording (HAMR), and microwave assisted magnetic recording (MAMR), that is described by J-G. Zhu et al. in "Microwave Assisted Magnetic Recording", IEEE Trans. Magn., vol. 44, pp. 125-131 (2008). Although MAMR has been in development for a number of years, it is not shown enough promise to be introduced into any products yet. In particular, a difficult challenge is to find a spin torque oscillator (STO) film that is thin enough to fit into the small write gap required for state of the art products while providing a high magnetic moment in the oscillation layer to generate a sufficient radio-frequency (RF) field for the microwave assist effect.

Spin transfer (spin torque oscillator or STO) devices are based on a spin-transfer effect that arises from the spin dependent electron transport properties of ferromagnetic-non-magnetic spacer-ferromagnetic multilayers. When a spin-polarized current passes through a magnetic multilayer in a CPP (current perpendicular to plane) configuration, the magnetic moment of electrons incident on a ferromagnetic layer interacts with magnetic moments of the ferromagnetic layer near the interface between the ferromagnetic and non-magnetic spacer. Through this interaction, the electrons transfer a portion of their angular momentum to the ferromagnetic layer. As a result, spin-polarized current can switch the magnetization direction of the ferromagnetic layer if the current density is sufficiently high.

In a PMR writer, the main pole generates a large local magnetic field to change the magnetization direction of the medium in proximity to the writer. By switching the direction of the field using a switching current that drives the writer, one can write a plurality of media bits on a magnetic recording medium. A new "assist" technology is needed to controllably boost or reduce the MP field on the magnetic medium, and that does not rely on generating a RF field or providing a heating mechanism since MAMR and HAMR have not reached a point of maturity that enables large-scale manufacturing and incorporation into actual devices.

SUMMARY

One objective of the present disclosure is to provide an improved PMR writer that is configured to enhance the MP field on a magnetic medium during the writing of a transition, and then reduces the MP field after a transition is written.

A second objective of the present disclosure is to provide a method of forming the PMR writer according to the first objective.

According to a first embodiment of the present disclosure, these objectives are achieved with a permanent magnet (PM) formed in a write gap (WG) and having a front side at the ABS, a cross-track width that is less than or equal to the track width of the MP trailing side, and a down-track thickness less than the WG thickness. The PM height is preferably less than or equal to that of the throat height of the magnetic trailing shield. A center plane that is orthogonal to the ABS bisects the PM at the ABS, and also bisects the MP trailing and leading sides. The PM has a magnetization opposing the WG field at the start of a transition. However, the PM magnetization flips to a direction substantially parallel to the WG field ($H_{WG}$) after a transition is written and $H_{WG}$ becomes saturated. As a result, the PM magnetic field enhances the MP field during a transition but reduces the MP field after the transition is written thereby improving direct current (DC) field ATE. Moreover, PM coercivity is sufficient so that PM magnetization will retain its flipped direction at the beginning of the next transition and once again will be anti-parallel to $H_{WG}$ to provide an assist effect to the MP field when writing the next transition.

Preferably, PM coercivity is in the range of 500 Oe to 8000 Oe, and the PM is made of CoPt, CoPd, FePt, or a multilayer structure with one or more of Co, Fe, Ni, Pt, Pd, or alloys thereof. In other embodiments, the PM is a CoPtCr—$SiO_2$ or FePt—$SiO_2$ composite.

According to a second embodiment, the PM is part of a spin flipping element having a front side at the ABS, and with the same thickness and width requirements as the PM in the first embodiment. The spin flipping element is formed closer to the first trailing shield (TS) with the addition of a spacer layer underneath the PM. The spacer layer may be Ta, Ru, W, Pt, Ir, Cu, Au, Pd, Ag, Cr, Al, or Ti, or a multilayer made by these elements.

Again, PM magnetization opposes $H_{WG}$ at the start of a transition but flips to a direction parallel to $H_{WG}$ when $H_{WG}$ exceeds the PM coercivity. Moreover, a current $I_b$ of sufficient magnitude may be applied across the PM during a transition to help control the PM magnetization flipping with the spin torque effect. The mechanism for PM flipping is spin torque applied to the PM magnetization from either the first TS or MP tip depending on the direction of $I_b$. PM magnetization will retain its flipped direction (for the next transition) once the applied current is removed because of sufficient PM coercivity as described previously.

In other embodiments, the PM of the first embodiment (or spin flipping element containing a PM in the second embodiment) is recessed to have the front side at a first height (h1) from the ABS, and a backside at a second height (h2) where h2>h1. Thus, the position of the PM in the WG may be adjusted to provide the best field gain and field gradient gain to enable improved writing of transitions. Accordingly, PM thickness may be significantly larger than in previous embodiments because of a greater distance between the main pole and trailing shield at heights including h1 and h2, but PM down-track thickness is still less than the WG thickness at h1 and h2. PM magnetic field assist during a transition depends on h1, $H_{WG}$ magnitude, and the size (volume) of the PM.

A method of forming a PM in a write gap is also described. A conventional process flow is followed to provide a MP with a MP tip adjoined on each side by a side gap and on a bottom surface (leading side) with a leading gap. A side shield contacts an outer side of each side gap, and a leading shield contacts a bottom surface of the leading gap and bottom surfaces of the side gaps. The main pole may have a tapered trailing side with a front edge at a first plane at the ABS where the first plane also comprises a top surface of each side gap and each side shield. According to one embodiment, a full film PM layer with or without an additional WG layer with total thickness equal to the desired final WG are sequentially deposited on the MP trailing side and on top surfaces of the side gaps and side shields. Then, a first photoresist layer is coated on the stack with the PM layer and optional WG layer. Using a photo mask and conventional photo process, the first photoresist layer is patterned to form a photoresist island having a cross-track width and height that corresponds to the desired width (w) and height of the PM. The photoresist island shape is transferred through the PM layer with an ion beam etch (IBE) or reactive ion etch (RIE). Additional WG material is refilled on areas that are etched away to form a WG covering beyond the island shape, and then any remaining photoresist is removed. Next, the first TS layer and a second photoresist layer are sequentially formed on the WG top surface. The second photoresist layer is patterned to form a second photoresist island having a width (w1) and height corresponding to the desired width and height of the first TS where w1>w. Subsequently, the second photoresist island shape is etch transferred through the WG and first TS layer and stops on the side shields to form a WG side that is coplanar with a first TS side on each side of the center plane. Thereafter, a second TS layer is deposited on the side shields and on the first TS top surface.

DETAILED DESCRIPTION

Figure 1:
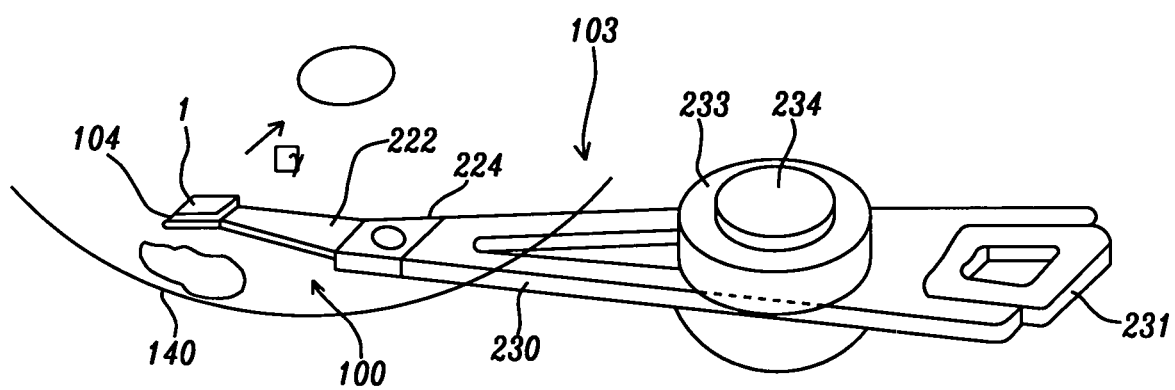
FIG. 1 is a perspective view of a head arm assembly of the present disclosure.

The present disclosure is a PMR writer structure wherein a permanent magnet (PM) is formed within a write gap and generates a magnetic field that enhances the MP field during a write process at the start of a transition, and where PM magnetization flips to an opposite direction that is parallel to the WG field ($H_{WG}$) when $H_{WG}$ increases beyond the PM coercivity after the transition is written thereby reducing the MP field on the magnetic medium to improve ATE. The PMR writer is not limited to the structure shown in the exemplary embodiments, and may have other designs for the leading loop and trailing loop pathways for magnetic flux return, other coil designs and different schemes for the leading shield and trailing shield structures, for example. In the drawings, the y-axis is in a cross-track direction, the z-axis is in a down-track direction, and the x-axis is in a direction orthogonal to the ABS and towards a back end of the PMR writer. Thickness refers to a down-track distance, width is a cross-track distance, and height is a distance from the ABS in the x-axis direction. The terms "flipping" and "switching" may be used interchangeably when referring to changing a magnetization direction in the PM layer.

The term "behind" refers to an x-axis position of one structural feature with respect to another. For example, component B formed behind (or beyond) component or plane A means that B is at a greater height from the ABS than A. A "front side" of a layer is a side facing the ABS, and a backside or backend faces away from the ABS. The terms "above" and "below" refer to a down-track (DT) position of one layer with respect to another layer or plane.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

Figure 2:
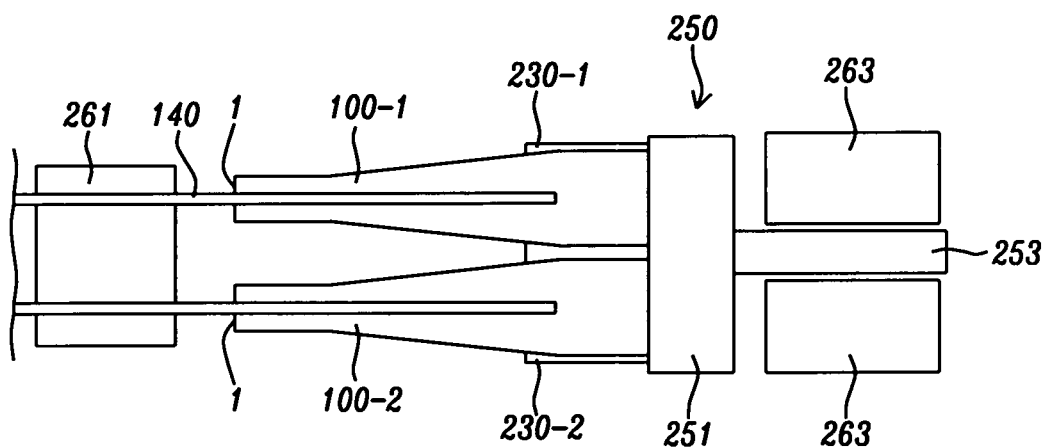
FIG. 2 is side view of a head stack assembly of the present disclosure.

HGA 100 is mounted on an arm 230 formed in the head arm assembly 103. The arm moves the magnetic recording head 1 in the cross-track direction y of the magnetic recording medium 140. One end of the arm is mounted on a base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. Arm 230 may be driven by changing the magnetic flux in the voice coil. Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
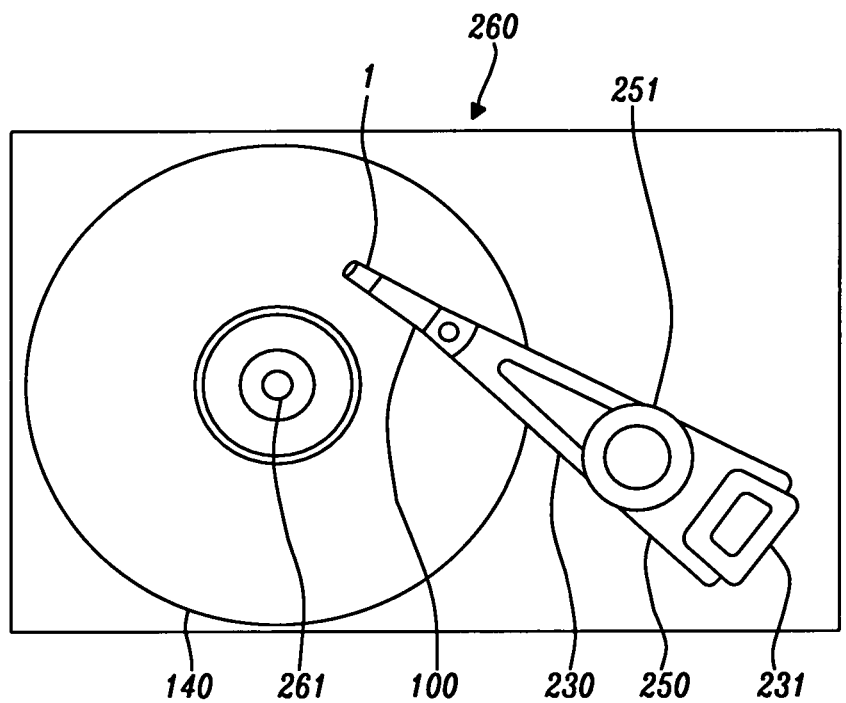
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and voice coil motor actuator correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
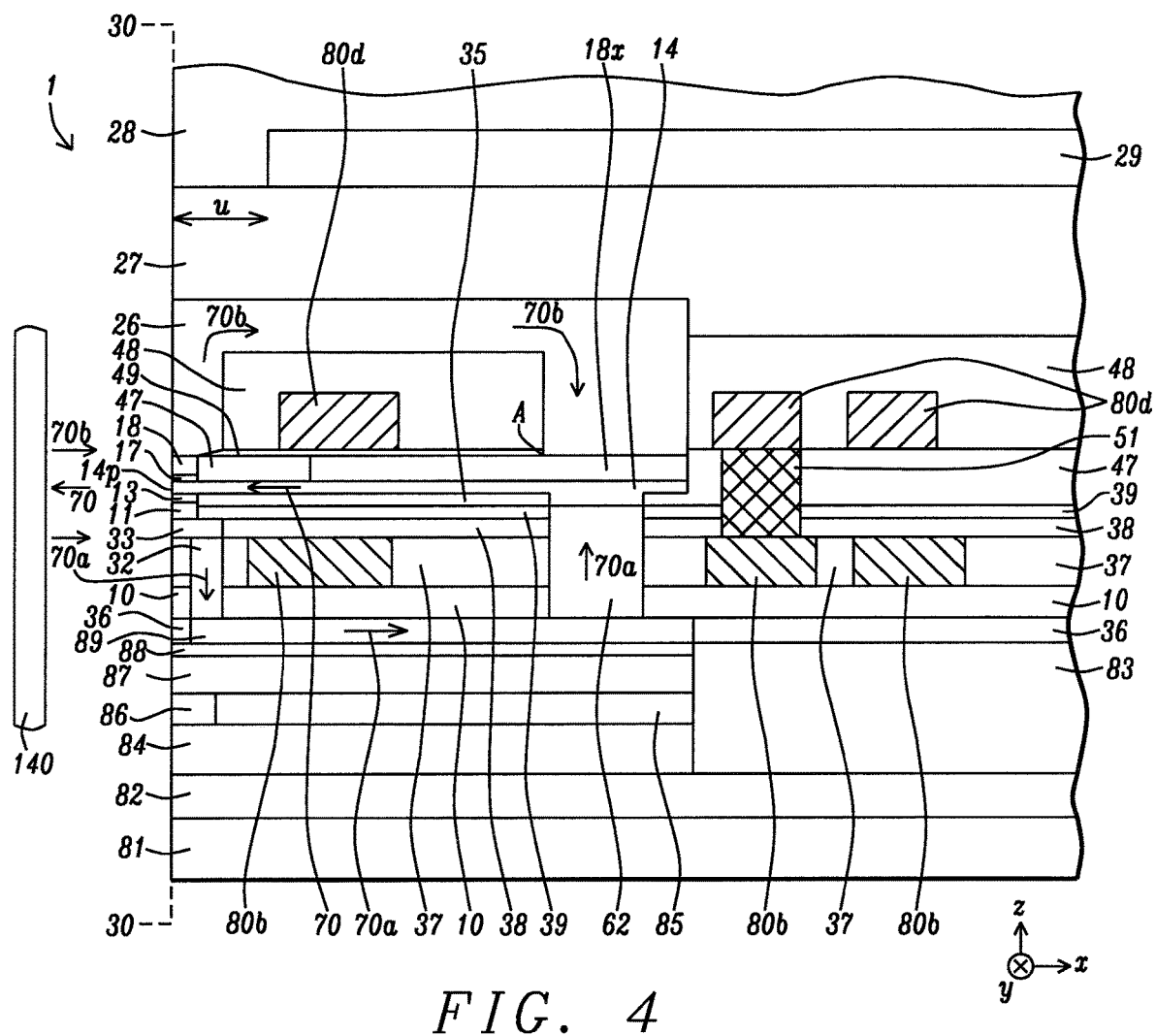
FIG. 4 is a down-track cross-sectional view of a combined read-write head with leading and trailing loop pathways for magnetic flux return to the main pole according to an embodiment of the present disclosure.

Referring to FIG. 4, magnetic recording head 1 comprises a combined read-write head. The down-track cross-sectional view is taken along a center plane (44-44 in FIG. 5) formed orthogonal to the ABS 30-30, and that bisects the main pole layer 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is between being parallel or antiparallel to the pinned layer magnetization, which resulted in a change in the resistance. This resistance is measured to give an indication of the magnetic field near the read element. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in main pole (MP) layer 14 is generated with flowing a current through bucking coil 80b and driving coil 80d that are below and above the main pole layer, respectively, and are connected by interconnect 51. Magnetic flux 70 exits the main pole layer at pole tip 14p at the ABS 30-30 and is used to write a plurality of bits on magnetic media 140. Magnetic flux 70b returns to the main pole through a trailing loop comprised of trailing shields 17, 18, PP3 shield 26, and top yoke 18x. There is also a leading return loop for magnetic flux 70a that includes leading shield 11, leading shield connector (LSC) 33, S2C 32, return path 89, and back gap connection (BGC) 62. The magnetic core may also comprise a bottom yoke 35 below the main pole layer. Dielectric layers 10, 11, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

Figure 5:
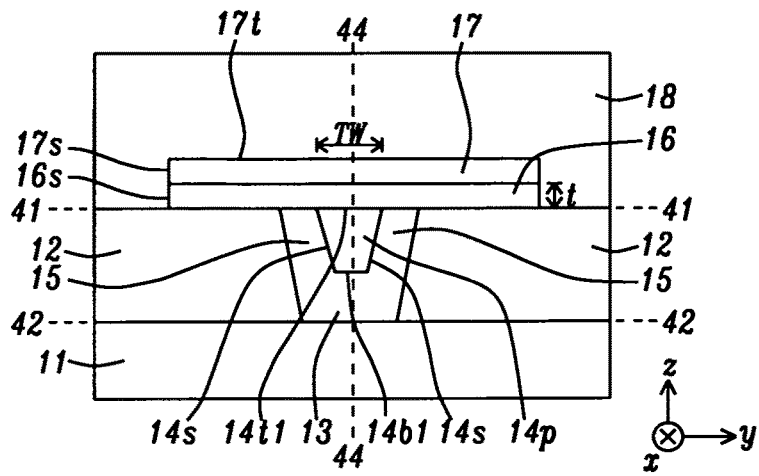
FIG. 5 is an ABS view of an all wrap around (AWA) shield structure surrounding a main pole according to a prior art design used by the inventors.

Referring to FIG. 5, a MP with MP tip 14p having a track width TW, trailing side 14t1, leading side 14b1, and two sides 14s formed equidistant from a center plane 44-44 is shown with an AWA shield structure that is known to the inventors. Write gap 16 with thickness t is on the MP trailing side, and there are side gaps 15 adjoining each MP side, and a leading gap 13 below the MP leading side. The trailing shield structure comprises a first trailing shield (TS) with a high magnetic saturation value from 19 kiloGauss (kG) to 24 kG, and with a front portion 17a on the write gap. The trailing shield structure also includes a second TS 18 formed on the first TS top surface 17t and sides 17s, on write gap sides 16s, and on a top surface of the side shields 12 at plane 41-41. Plane 41-41 includes the trailing edge of the MP trailing side at the ABS. Side shields contact a top surface of the leading shield 11 at plane 42-42 that is parallel to plane 41-41 and includes the MP leading side at the ABS.

Figure 6A:
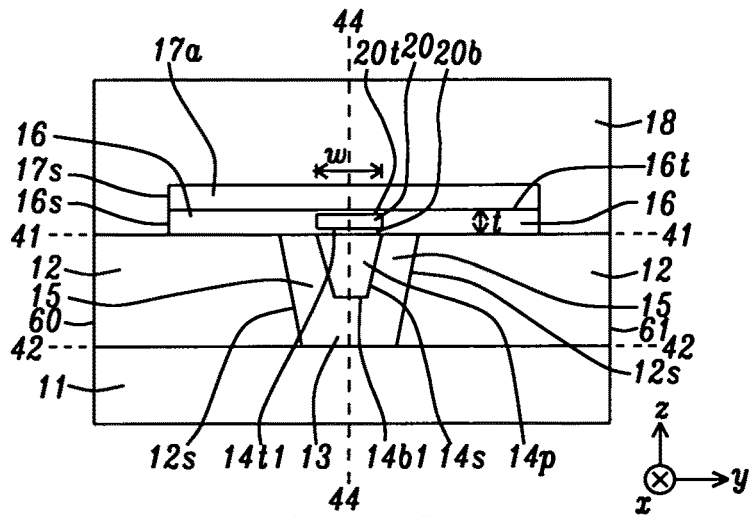
FIG. 6A is an ABS view of a PMR writer having a permanent magnet (PM) formed within a write gap between a trailing side of a main pole and a trailing shield structure according to a first embodiment of the present disclosure.

According to a first embodiment of the present disclosure illustrated in FIG. 6A, the PMR writer structure in FIG. 5 is modified with insertion of a PM 20 in the write gap 16. The PM has a thickness s between a top surface 20t and a bottom surface 20b thereof where s is preferably less than the WG thickness. Thus, a portion of the WG is formed above and below the PM such that PM top and bottom surfaces are separated from first TS 17 and MP tip 14p, respectively. Moreover, the PM is bisected by center plane 44-44 and has a width w where w≤TW. Far sides 60, 61 of the shield structure are shown on opposing sides of the center plane.

Figure 11:
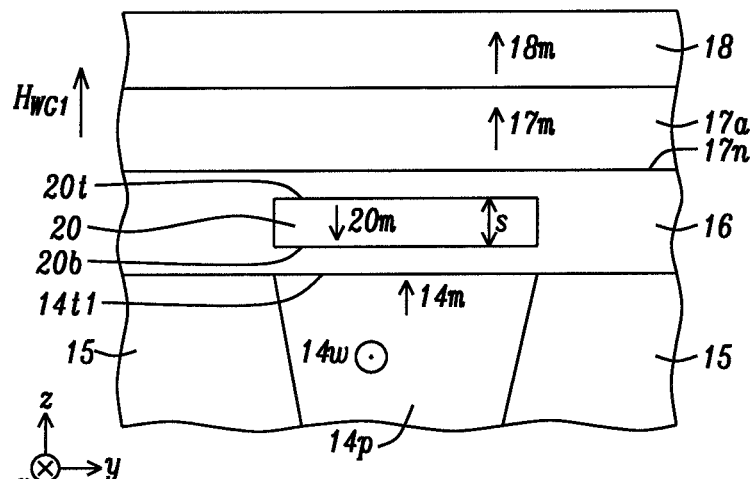
FIG. 11 is an ABS view of the PMR writer in the first embodiment wherein the PM magnetization is oriented anti-parallel to the write gap field.
Figure 12:
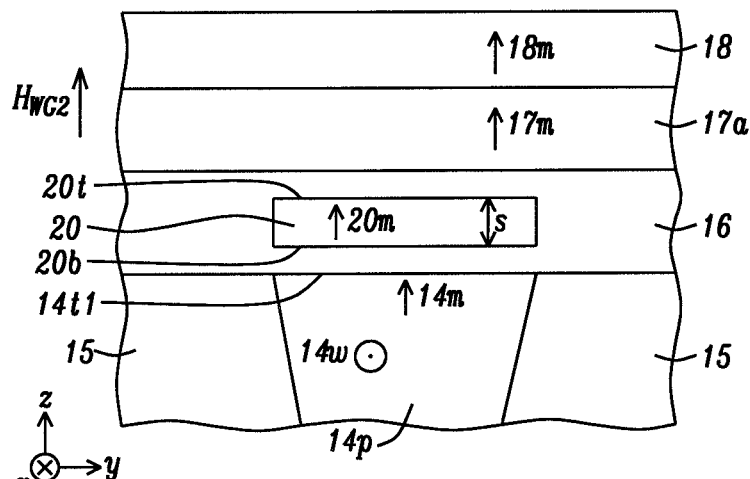
FIG. 12 is an ABS view of the PMR writer in FIG. 11 after the write gap field ($H_{WG2}$) is saturated and causes PM magnetization to flip to a direction substantially parallel to $H_{WG2}$ according to an embodiment of the present disclosure.

A key feature is that the PM has a coercivity that is in a range of 500 Oe to 8000 Oe so that when the PMR writer is writing a transition on a magnetic medium (not shown), PM magnetization 20m will be aligned substantially in the opposite down-track direction as the WG field ($H_{WG1}$) in FIG. 11, but will flip to a direction parallel to the WG field after the transition is written when the WG field ($H_{WG2}$) becomes saturated and exceeds PM coercivity as indicated in FIG. 12. Furthermore, PM magnetization will retain the flipped direction at the beginning of next transition, and once again is anti-parallel to the WG field that will be opposite to the direction of $H_{WG1}$ in the previous transition. MP magnetization 14m that is proximate to MP trailing side 14t1 and first TS magnetization 17m that is proximate to first TS bottom surface 17n are also aligned parallel to $H_{WG1}$ and $H_{WG2}$, respectively, in FIG. 11 and FIG. 12.

As explained in related application Ser. No. 16/037,197, when a magnetization in a magnetic layer within the WG is opposed to the WG field, there is increased reluctance in the WG that causes the MP field to be enhanced. In the present disclosure, there is a further advantage when writing a transition in that the PM also has a magnetic field (see simulation in FIG. 7) that assists the MP field on a magnetic medium. Thus, PM magnetization not only opposes $H_{WG}$ ($H_{WG1}$ in FIG. 11) and thereby enhances the MP field, but the PM field provides an assist in writing a transition on a magnetic bit. Another important feature is that after the transition when $H_{WG}$ ($H_{WG2}$ in FIG. 12) exceeds PM coercivity and causes PM magnetization to flip, the PM magnetic field and PM magnetization are both reversed and serve to reduce the MP field to minimize ATE.

In some embodiments, the PM is made of CoPt, CoPd, FePt, or a multilayer structure with one or more of Co, Fe, Ni, Pt, Pd, Ir, Ru, Cr or alloys thereof. In other embodiments, the PM is a CoPtCr—$SiO_2$ or FePt—$SiO_2$ composite that is formed by sputter depositing a CoPtCr—$SiO_2$ or FePt—$SiO_2$ target, and has a polycrystalline structure typical of the material used in commercial PMR media.

Figure 6B:
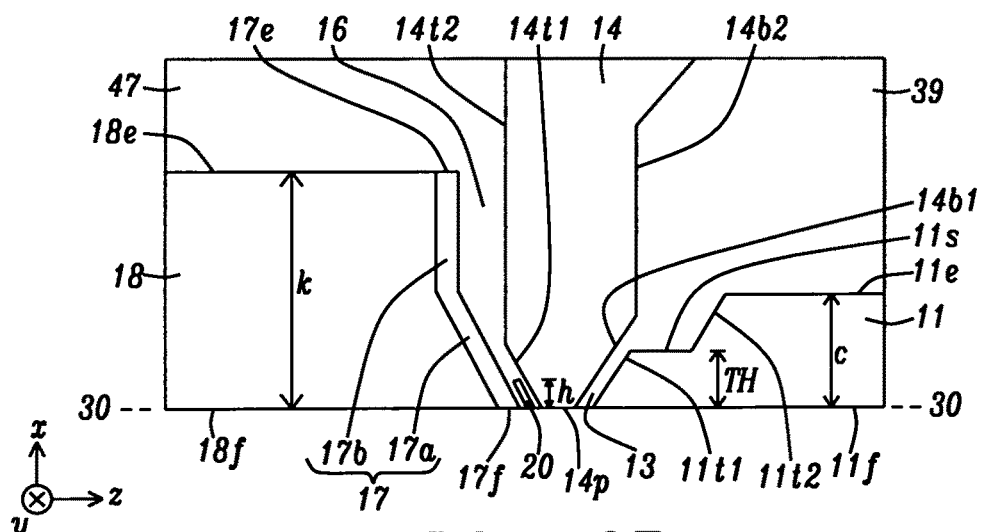
FIG. 6B is a down-track cross-sectional view of the MP, leading shield, and trailing shield structure of the PMR writer in FIG. 6A.

The down track cross-sectional view at center plane 44-44 in FIG. 6A is illustrated in FIG. 6B. MP leading side 14b1 is tapered and connects with MP bottom surface 14b2 that is aligned orthogonal to the ABS 30-30, and formed on dielectric layer 39. According to a leading shield (LS) design disclosed in related U.S. Pat. No. 10,014,021, the LS top surface may have a notch such that a first portion 11t1 of the LS top surface is substantially parallel to the tapered MP leading side and extends from the ABS to a throat height (TH). A second portion 11t2 of the LS top surface is also substantially parallel to the tapered MP leading side but is a greater distance therefrom and is connected to first portion 11t1 by LS side 11s that is parallel to the ABS. LS backside 11e is at height c from the ABS while LS front side 11f is at the ABS. This LS design enables improvement in overwrite, bit error rate, and tracks per inch capability (TPI) capability compared with a LS top surface not having a notch.

The MP trailing side 14t1 is also tapered and connects with MP top surface 14t2 that is parallel to the MP bottom surface. Dielectric layer 47 adjoins the MP top surface and backsides 17e, 18e of first TS 17 and second TS 18, respectively, at height k. Typically, k>c. First TS comprises a front portion 17a that is substantially parallel to the MP tapered trailing side and has a front side 17f at the ABS, and comprises a back portion 17b that is parallel to the MP top surface. PM 20 has height (h) from the ABS that is from 20 nm to 80 nm. Preferably, h≤k and less than the (TH) TH of the leading shield 11. It should be understood that other leading shield and trailing shield designs are compatible with the PM feature of the present disclosure. Thus, the embodiments of the present disclosure are not limited to the LS and TS shield designs depicted herein.

Figure 7:
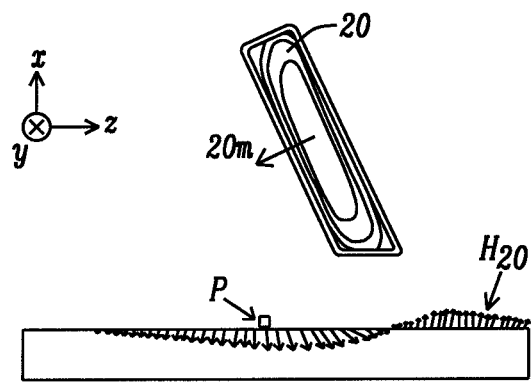
FIG. 7 is an illustration of PM magnetization, and PM magnetic field magnitude at a distance 15 nm below the center of the PM of the first embodiment.

Referring to FIG. 7, modeling of a PM 20 with magnetization 20m substantially in a down-track (z-axis) direction is depicted and shows magnetic field orientation and magnitude for PM magnetic field ($H_{20}$) at 15 nm below the PM bottom position where a magnetic medium is typically located during a write process. Arrows pointing substantially in the down (−x axis) direction are locations where the PM magnetic field assists the MP field (not shown). The center of the magnetic bit (not shown) being written to is proximate to point P.

Figure 8:
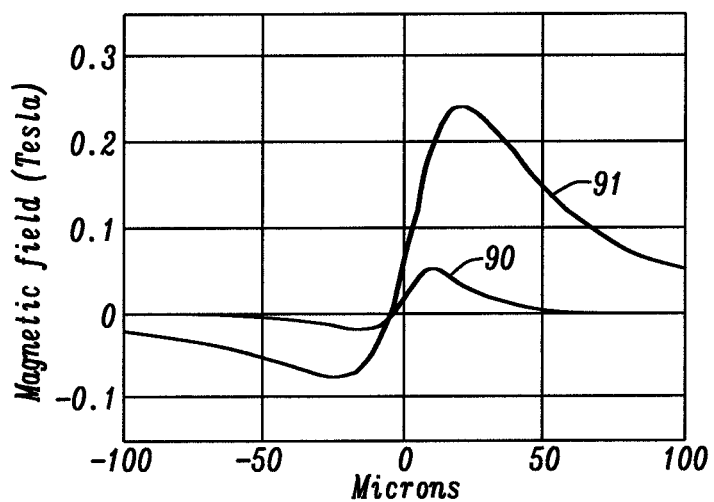
FIG. 8 is a plot showing the PM magnetic field of a 40 nm×40 nm×5.5 nm PM with Ms=2 Tesla in a perpendicular direction and longitudinal direction at a distance 15 nm below the PM center according to the first embodiment.

FIG. 8 shows a plot of magnetic field as a function of location in the down-track (z-axis) direction represented by curve 90, and in the perpendicular (x-axis) direction represented by curve 91 at 15 nm below the PM bottom surface. The PM has a width of 40 nm, height of 40 nm, and thickness of 5.5 nm, and a saturation magnetization (Ms)=2 Tesla.

Figure 9A:
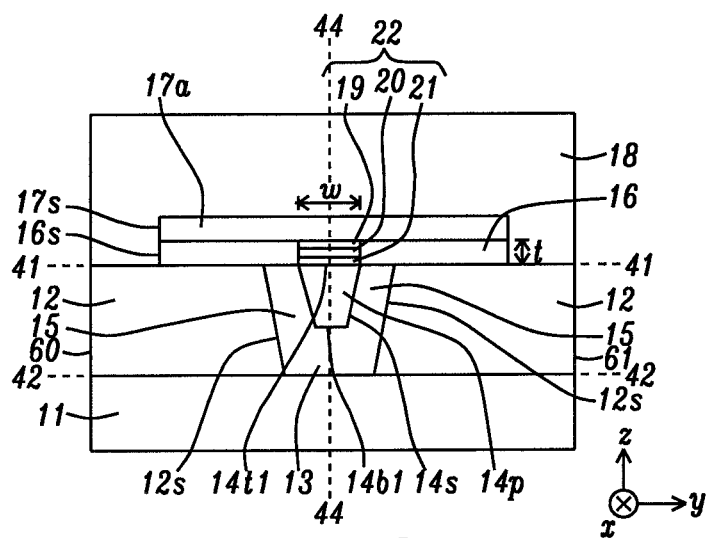
FIG. 9A is an ABS view of a PMR writer having a permanent magnet (PM) formed between a spin polarization preserving layer and a non-spin polarization preserving layer, and within a write gap according to a second embodiment of the present disclosure.

Referring to FIG. 9A, a second embodiment of the present disclosure is depicted wherein a PM is formed within a spin flipping element hereinafter called flipping element 22 within write gap 16. The flipping element has a thickness t preferably from 5 nm to 30 nm that is equal to the write gap thickness, and a width w that is preferably less than or equal to the track width TW of the MP tapered trailing side 14t1 at the ABS. The PM 20 is selected from the same materials as in the first embodiment. The flipping element has a stack wherein a non-spin polarization preserving layer 21, the PM, and spin polarization preserving layer 19 are sequentially formed on the MP tapered trailing side, and the spin polarization preserving layer contacts the first TS 17a. The non-spin polarization preserving layer is typically a metal conductor such as Ta, W, Pt, Ru, Ti, or Pd, and the spin polarization preserving layer is also a conductive layer and is preferably comprised of Cu, Ag, Au, Al, or Cr, or an alloy thereof.

Figure 13:
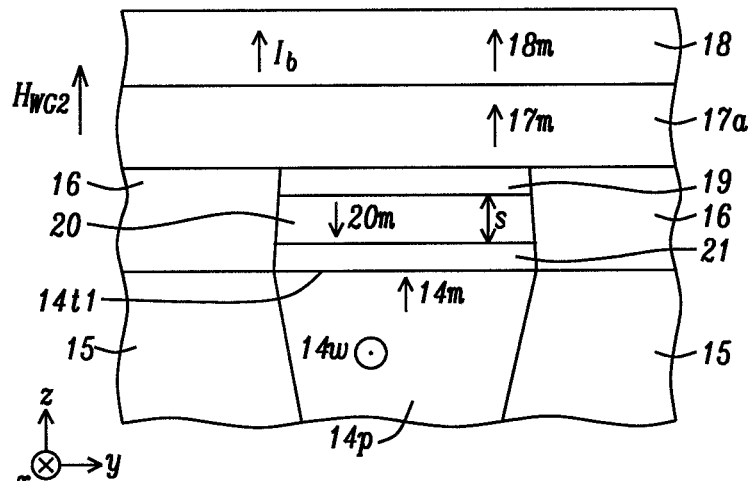
FIG. 13 is an ABS view of the PMR writer of the second embodiment after a current of sufficient magnitude is applied to flip PM magnetization to a direction opposite to $H_{WG2}$.

Similar to the first embodiment (FIG. 11), PM magnetization 20m is substantially anti-parallel to the WG field $H_{WG1}$ and to MP magnetization 14m at MP trailing side 14t1, and anti-parallel to first TS and second TS magnetizations 17m, 18m, respectively, when writing a transition. However, as depicted in FIG. 13, when a current $I_b$ of sufficient magnitude is applied in a direction parallel to saturated WG field $H_{WG2}$, magnetization 20m will maintain the direction that is anti-parallel to $H_{WG2}$ for a longer time than without the current $I_b$ before eventually flipping at sufficiently high $H_{WG2}$. In preferred embodiments, $I_b$ has a current density in a range of $1 \times 10^{-7}$ to $1 \times 10^{-9}$ Amp/$cm^2$. In order for the flipping element to have acceptable reliability, the magnitude of current $I_b$ must be maintained as low as possible since excessive current may cause degradation of one or more layers 19-21 due to electromigration and/or excessive local heating. In addition, it is preferred that $I_b$ is not so large such that the magnetization of PM 20 is still aligned in the direction that is parallel to the gap field at the end of writing the current bit.

Figure 9B:
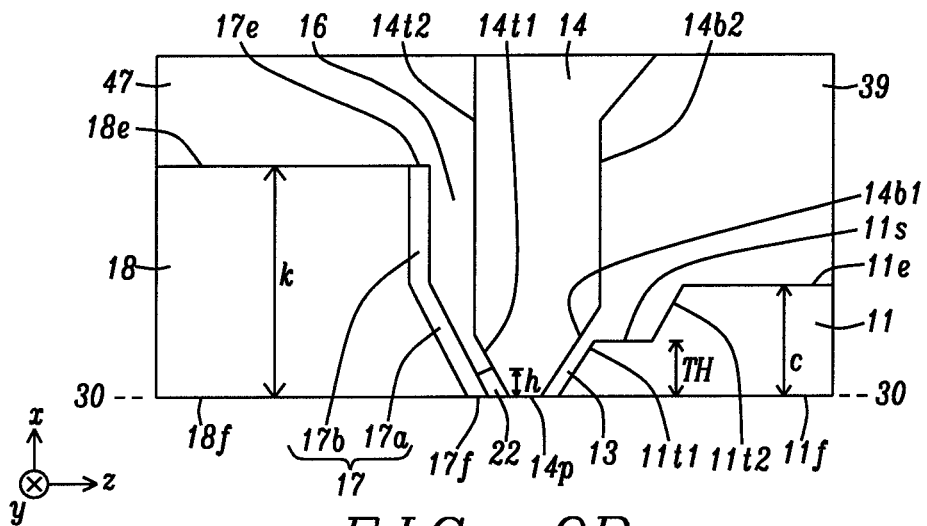
FIG. 9B is a down-track cross-sectional view of the MP, leading shield, and trailing shield structure of the PMR writer in FIG. 9A.

In FIG. 9B, a down-track cross-sectional view at plane 44-44 in FIG. 9A is illustrated. Flipping element 22 and the PM therein (not shown) extend from the ABS 30-30 to a height h of 20 nm to 80 nm. MP 14, LS 11, and TS 17 retain the structural features described earlier with respect to the first embodiment in FIG. 6B.

Figure 10A:
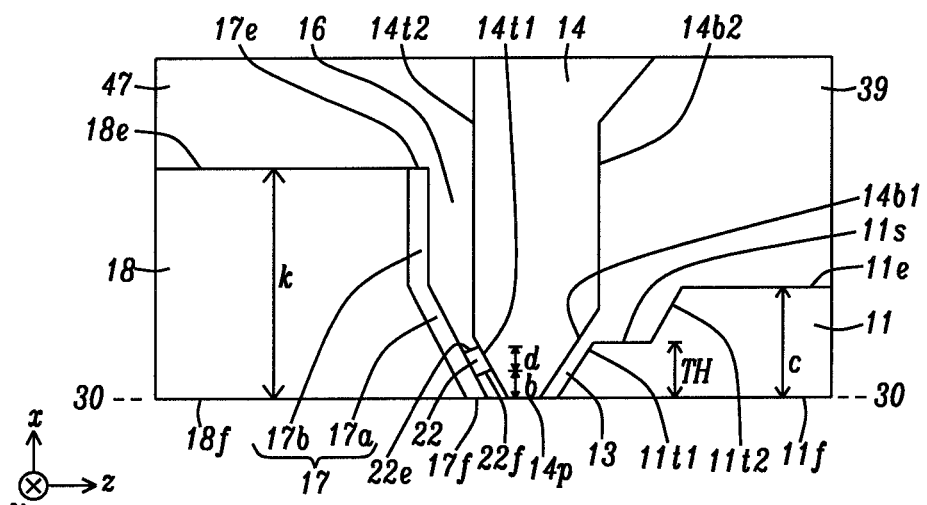
FIG. 10A is a down-track cross-sectional view of a PMR writer wherein a spin flipping element containing a permanent magnet in the write gap is recessed from the ABS according to a third embodiment of the present disclosure.

Referring to FIG. 10A, a third embodiment of the present disclosure is illustrated from a down-track cross-sectional view. In the exemplary embodiment, the flipping element 22 comprised of PM 20 is retained from the second embodiment but a front side 22f thereof is recessed at height b that is >0 nm but ≤50 nm from ABS 30-30. The flipping element has a height d of 20 nm to 80 nm between the front side 22f and backside 22e thereof. In this case, at least a portion of the flipping element may be at a height greater than TH.

Figure 10B:
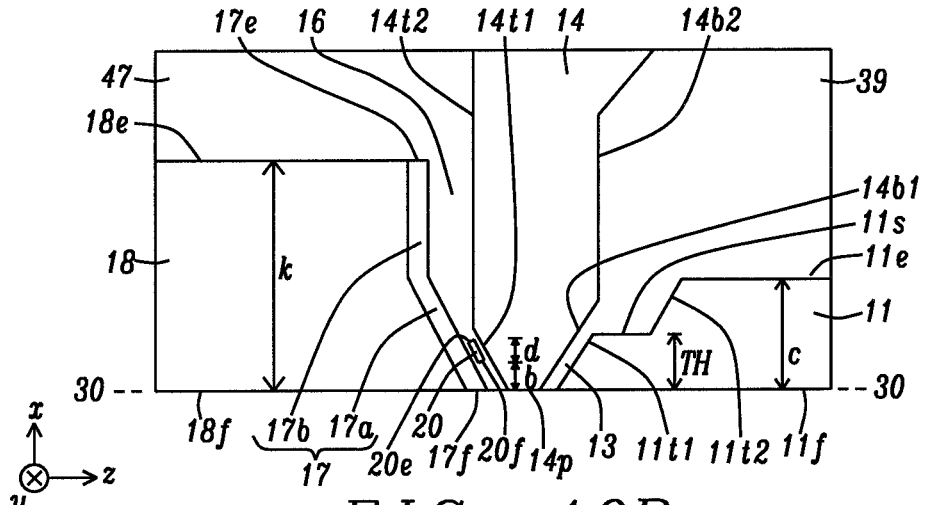
FIG. 10B is a down-track cross-sectional view of a PMR writer wherein a permanent magnet in the write gap is recessed from the ABS according to a fourth embodiment of the present disclosure.

Alternatively, in FIG. 10B, a fourth embodiment is shown where the first embodiment is modified to form a recessed PM 20 with a front side 20f that is >0 nm but ≤50 nm from ABS 30-30. Preferably, the recessed PM has a height d of 20 nm to 80 nm between the PM front side and the backside 20e. It is believed that a recessed PM (or as a recessed PM layer in a flipping element) offers flexibility in optimizing field gain (MP field and $H_{20}$ in FIG. 7) and field gradient gain thereby optimizing the writing of transitions.

Figure 14:
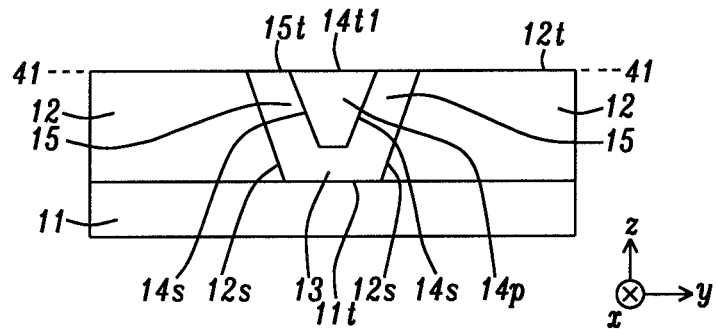
FIGS. 14-18 show ABS views of a sequence of steps that are used to form a PM within a WG and having a thickness less than the WG thickness according to an embodiment of the present disclosure.

The present disclosure also encompasses a method of fabricating a PMR writer with an AWA shield structure around a MP, and where a PM 20 is formed in a write gap 16 between the MP tip 14p and the first TS 17a at the ABS. From a perspective at the eventual ABS in FIG. 14, leading shield 11 is plated first on a substrate and then side shield (SS) layer 12 is plated using conventional methods. All layers (not shown) below LS 11 are formed by well known processes and are not described herein. A conventional sequence of steps is used to form an opening (not shown) in the SS layer that exposes sides 12s and LS top surface 11t. Thereafter, a gap layer comprised of side gaps 15 and leading gap 13 is conformally deposited to partially fill the opening. Then, the MP layer including MP 14p is deposited on the side gaps and leading gap to fill the opening. A CMP process may be performed to generate a MP trailing side 14t1 that is coplanar with side shield top surfaces 12t and side gap top surfaces 15t at plane 41-41. A well known process may be employed to form a taper (not shown) on the MP trailing side.

Figure 15:
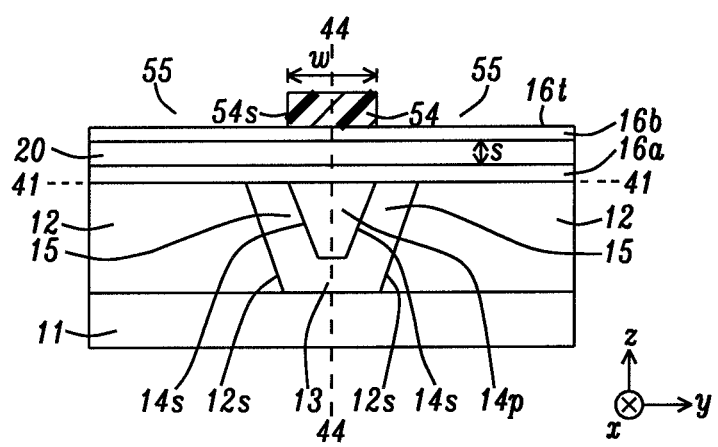

Referring to FIG. 15, a first WG layer 16a, PM layer 20 with thickness s, and second WG layer 16b are sequentially deposited on top surfaces of side shields 12, side gaps 15 and MP tapered trailing side 14t1. A first photoresist layer is coated on the second WG layer, and is patternwise exposed via a photo mask and developed to form photoresist island 54 that is bisected by center plane 44-44 and has sides 54s separated by width w. Portions of WG top surface 16t are uncovered by opening 55 on each side of the center plane.

Figure 16:
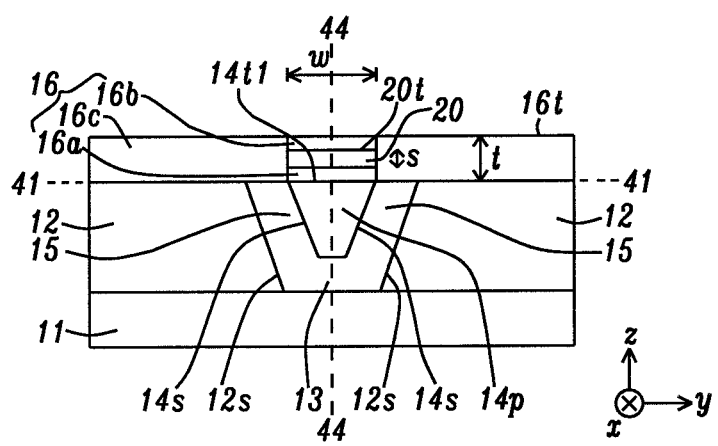

Referring to FIG. 16, openings 55 are etch transferred through exposed portions of the second WG layer 16b, PM layer 20, and first WG layer 16a using a RIE or IBE process that stops at plane 41-41 and thereby forms PM 20 having width w and thickness s on first WG layer 16a. A third write gap layer 16c is then deposited on side gaps 15, and side shields 12 before the photoresist is removed. Hereinafter, WG 16 is shown as the combination of WG layers 16a-16c.

Figure 17:
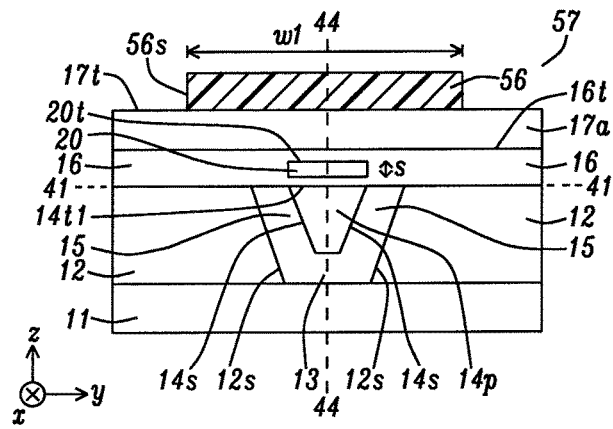

In FIG. 17, the partially formed writer with PM in FIG. 16 is shown after first TS 17 with a Ms preferably from 19 kG to 24 kG is deposited on WG 16. Then, a second photoresist is coated on the first TS and is patternwise exposed using a photo mask and developed to form a second photoresist island 56 that is bisected by center plane 44-44 and has a width w1 between sides 56s where w1>w. Openings 57 on each side of the second photoresist island expose a portion of first TS top surface 17t.

Figure 18:
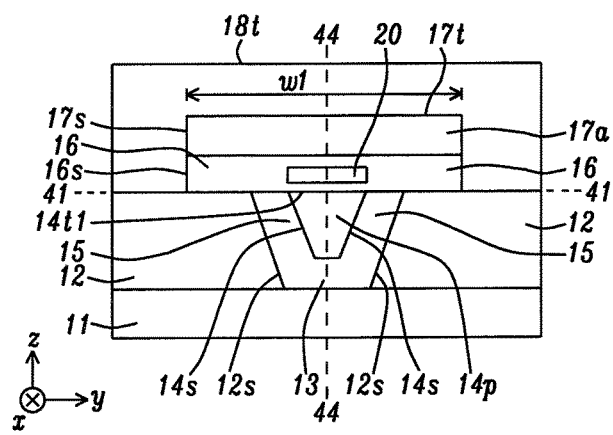

FIG. 18 depicts the partially formed PMR writer in FIG. 17 after a RIE or IBE process is employed to transfer opening 57 through exposed portions of first TS 17 and WG 16 and stops on a top surface of side shields 12 (at plane 41-41) on each side of the center plane 44-44. Then, the second TS 18 with a Ms of 10 kG to 19 kG is deposited on the side shields and first TS top surface 17t. Subsequently, conventional steps known to those skilled in the art are followed to complete the trailing shield structure and form a PMR writer as shown in FIG. 4. Note that a lapping process is the final step in forming an ABS at plane 30-30.

While the present disclosure has been particularly shown and described with reference to, the preferred embodiments thereof, it will be understood by those skilled in the art that various changes in form and details may be made without departing from the spirit and scope of this disclosure.

I claim:

1. A perpendicular magnetic recording (PMR) writer, comprising:
   (a) a main pole (MP) with a MP tip having a leading side and a trailing side, the leading side adjoins a leading gap at an air bearing surface (ABS), and the trailing side has a track width (TW) and adjoins a write gap (WG) at the ABS, and has a trailing edge formed on a first plane that is orthogonal to the ABS;
   (b) a shield structure comprising a first trailing shield (TS) on the write gap; and
   (c) a permanent magnet (PM) formed within the WG and between the MP tip and first TS wherein the PM has a cross-track width w where w≤TW, a down-track thickness that is less than a WG thickness, and a backside that is less than a throat height of a leading shield from the ABS, and the PM is configured with a magnetization that is opposite to a WG field ($H_{WG}$) at an onset of writing a transition thereby enhancing a MP field, and the PM magnetization flips to a direction parallel to $H_{WG}$ when $H_{WG}$ exceeds a PM coercivity after the transition is written.

2. The PMR writer of claim 1 wherein the PM has a front side at the ABS, and the backside is at a height that is from 20 nm to 80 nm from the ABS.

3. The PMR writer of claim 1 wherein the PM is one of Co, Fe, Ni, CoPt, CoPd, FePt, or a multilayer structure with one or more of Co, Fe, Ni, Pt, Pd, Ir, Ru, Cr, or alloys thereof.

4. The PMR writer of claim 1 wherein the PM is a polycrystalline structure comprised of a CoPtCr—$SiO_2$ or FePt—$SiO_2$ composite.

5. The PMR writer of claim 1 wherein the PM coercivity is from 500 Oe to 8000 Oe.

6. The PMR writer of claim 1 wherein the PM has a top surface and a bottom surface that are between the first TS and MP tip.

7. The PMR writer of claim 1 wherein the PM has a magnetic field that assists the MP field during the process of writing a transition on a magnetic bit proximate to the MP tip and PM.

8. The PMR writer of claim 1 further comprising:
   (a) a side gap that contacts a side of the main pole formed between the trailing side and leading side on each side of a center plane that bisects the MP tip in a direction orthogonal to the ABS and the first plane;

(b) a side shield contacting each side gap;

(c) the leading shield adjoining a bottom surface of the leading gap at a second plane that is parallel to the first plane, and contacting a bottom surface of each side shield; and (d) a second trailing shield formed on the first TS and on a top surface of each side shield at the first plane thereby forming an all wrap around (AWA) shield structure.

9. A head gimbal assembly (HGA), comprising:

(a) a slider on which the PMR writer of claim 1 is formed; and (b) a suspension that has a flexure to which the slider is joined, a load beam with one end connected to the flexure, and a base plate connected to the other end of the load beam.

10. A magnetic recording apparatus, comprising:

(a) the HGA of claim 9;

(b) a magnetic recording medium positioned opposite to the slider;

(c) a spindle motor that rotates and drives the magnetic recording medium; and (d) a device that supports the slider, and that positions the slider relative to the magnetic recording medium.

* * * * *